United States Patent
Yamada et al.

(10) Patent No.: US 7,155,781 B2
(45) Date of Patent: Jan. 2, 2007

(54) ELECTRONIC INSTRUMENT

(75) Inventors: Tsuneo Yamada, Kawagoe (JP);
Hidekazu Miyaoka, Tokyo (JP);
Katsuichi Sakurai, Tokyo (JP);
Minoru Taninai, Tokyo (JP); Koji Endo, Tokyo (JP)

(73) Assignees: Kabushiki Kaisha Strawberry Corporation (JP); Sony Ericsson Mobile Communications Japan, Inc. (JP)

( * ) Notice: Subject to any disclaimer, the term of this patent is extended or adjusted under 35 U.S.C. 154(b) by 0 days.

(21) Appl. No.: 10/540,205

(22) PCT Filed: Dec. 18, 2003

(86) PCT No.: PCT/JP03/16251

§ 371 (c)(1),
(2), (4) Date: Jun. 20, 2005

(87) PCT Pub. No.: WO2004/057201

PCT Pub. Date: Jul. 8, 2004

(65) Prior Publication Data

US 2006/0021195 A1 Feb. 2, 2006

(30) Foreign Application Priority Data

Dec. 19, 2002 (JP) ............................. 2002-368248

(51) Int. Cl.
*E05D 3/10* (2006.01)
*E05D 11/06* (2006.01)
(52) U.S. Cl. .......................................... 16/367; 16/374
(58) Field of Classification Search .................. 16/367, 16/374, 376, 377, 337, 340, 338; 248/276.1, 248/291.1, 919; 361/683, 803; 455/90, 455/550, 556, 575; 379/434, 433.13
See application file for complete search history.

(56) References Cited

U.S. PATENT DOCUMENTS

| 2,589,653 A | | 3/1952 | Alvarez-Tostado et al. |
| 2,766,103 A | | 10/1956 | Nielson et al. |
| 3,321,326 A | | 5/1967 | Young |
| 4,491,639 A | | 1/1985 | Happel et al. |
| 5,109,570 A | * | 5/1992 | Okada et al. .................. 16/289 |

(Continued)

FOREIGN PATENT DOCUMENTS

CA 2202590 10/1997

(Continued)

*Primary Examiner*—Katherine Mitchell
*Assistant Examiner*—Andre' L. Jackson
(74) *Attorney, Agent, or Firm*—Connolly Bove Lodge & Hutz LLP

(57) ABSTRACT

An object of the present invention is to provide a novel hinge device and an electronic instrument using the hinge device which is extremely high in commercial value.

A hinge device for pivoting a first member (1) and a second member (2), in which a first coupling member (3) having a shaft portion (5) is provided in one of said first member (1) and said second member (2), a second coupling member (4) having a bearing hole portion (6) for bearing said shaft portion (5) is provided in the other member, said first coupling member (3) and said second coupling member (4) are coupled with each other through the shaft portion (5) to be rotatable relative to each other so that the first member (1) may be rotated through the shaft portion (5) relative to the second member (2) in any direction of right and left directions, and an excessive rotation preventing mechanism (7) for preventing relative excessive rotation of the first member (1) in any direction of the right and left directions relative to the second member (2) is provided.

4 Claims, 12 Drawing Sheets

U.S. PATENT DOCUMENTS

| | | | |
|---|---|---|---|
| 5,843,391 A | 12/1998 | Yamamoto et al. | |
| 5,913,351 A * | 6/1999 | Miura | 16/340 |
| 5,970,580 A * | 10/1999 | Katoh | 16/337 |
| 6,163,928 A * | 12/2000 | Chung | 16/342 |
| 6,618,903 B1 * | 9/2003 | Kim | 16/337 |
| 6,813,813 B1 * | 11/2004 | Lu et al. | 16/342 |

FOREIGN PATENT DOCUMENTS

| | | |
|---|---|---|
| EP | 0 802 161 A1 | 10/1997 |
| JP | 63-079716 | 4/1988 |
| JP | 01-249903 | 10/1989 |
| JP | 02-242510 | 9/1990 |
| JP | 05-289774 | 11/1993 |
| JP | 06-201254 | 7/1994 |
| JP | 09-185430 | 7/1997 |
| JP | 10-235593 | 9/1998 |
| JP | 2001-154760 | 6/2001 |
| JP | 2002-227826 | 8/2002 |
| JP | 2002-310134 | 10/2002 |
| JP | 2003-120653 | 4/2003 |
| JP | 2003239942 A * | 8/2003 |
| JP | 2004332874 A * | 11/2004 |
| SU | 899464 | 1/1982 |
| WO | WO 03-033924 | 4/2003 |

* cited by examiner

FIG. 7
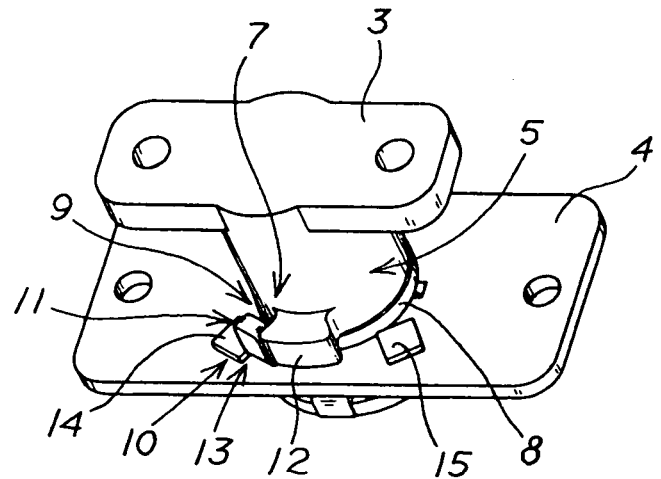
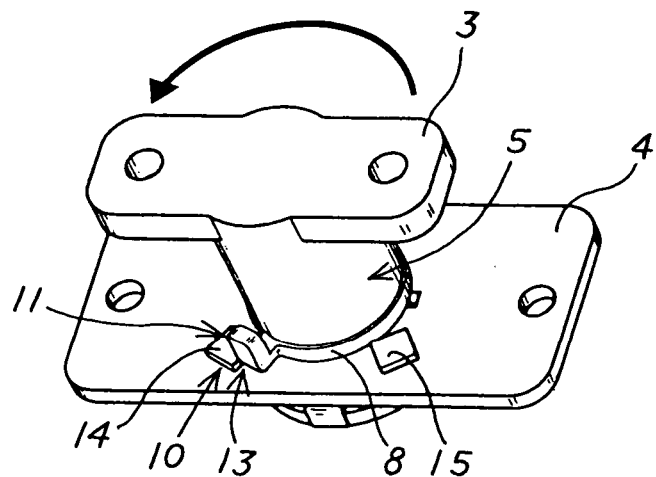
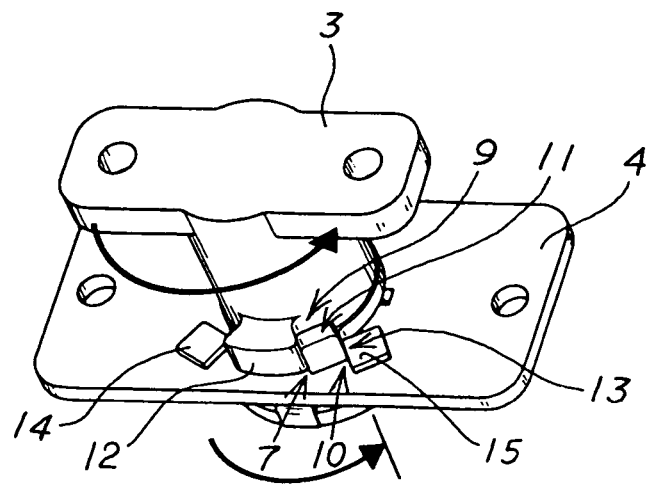

FIG. 8
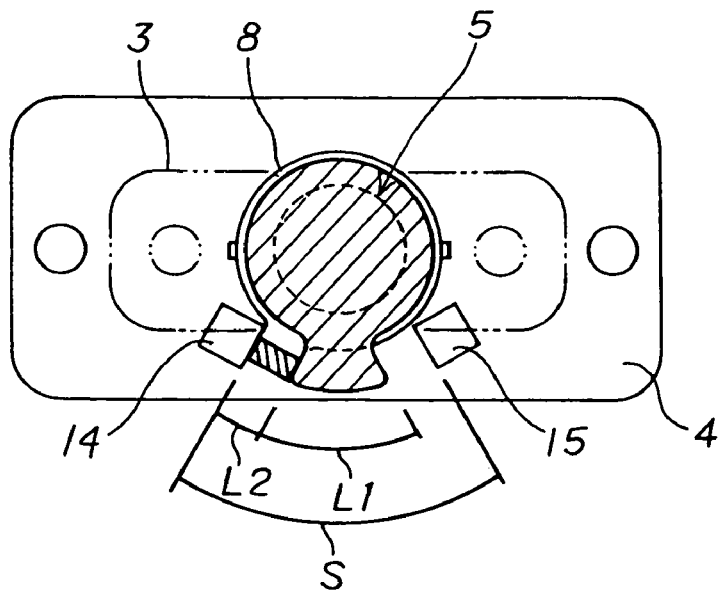
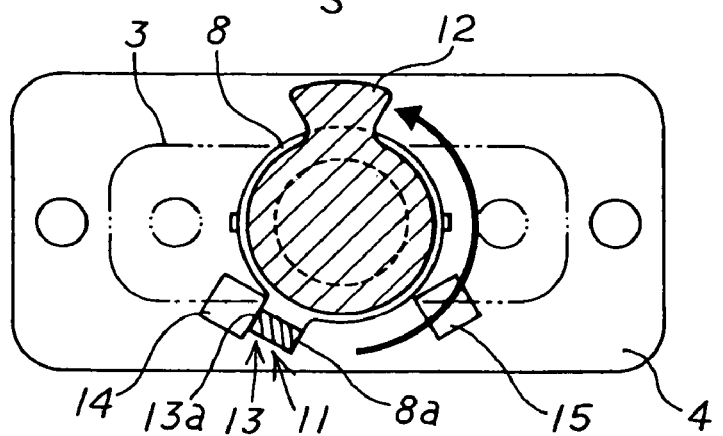
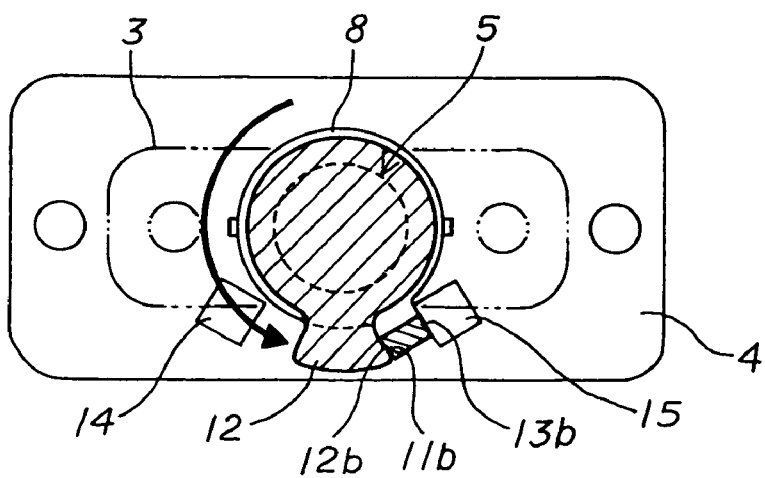

FIG. 14
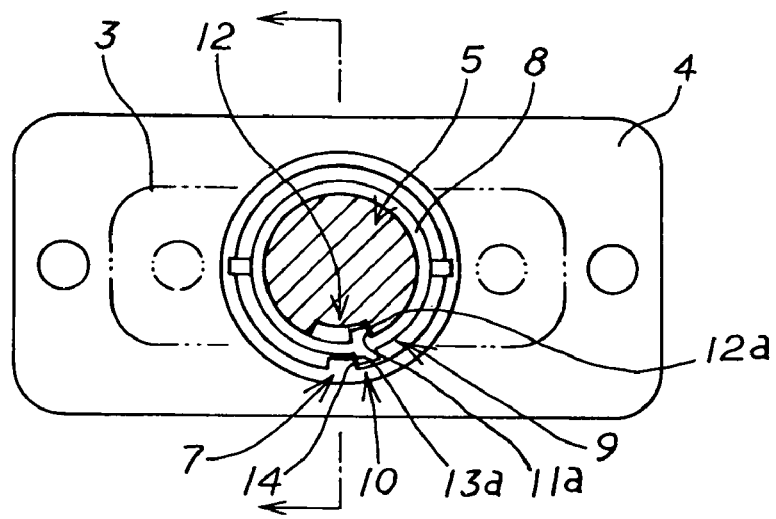
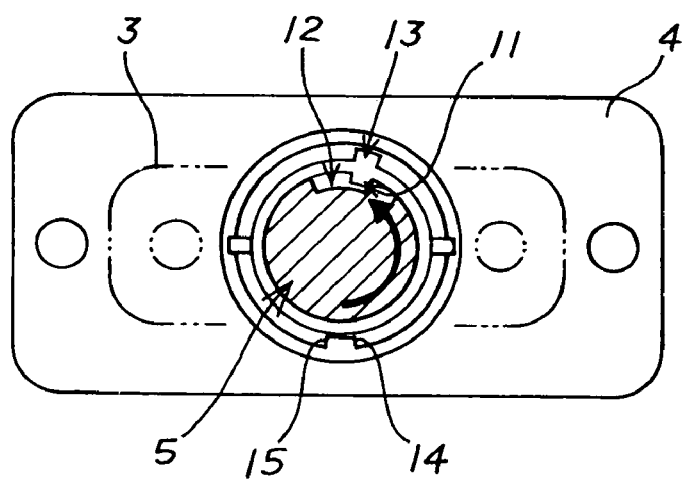
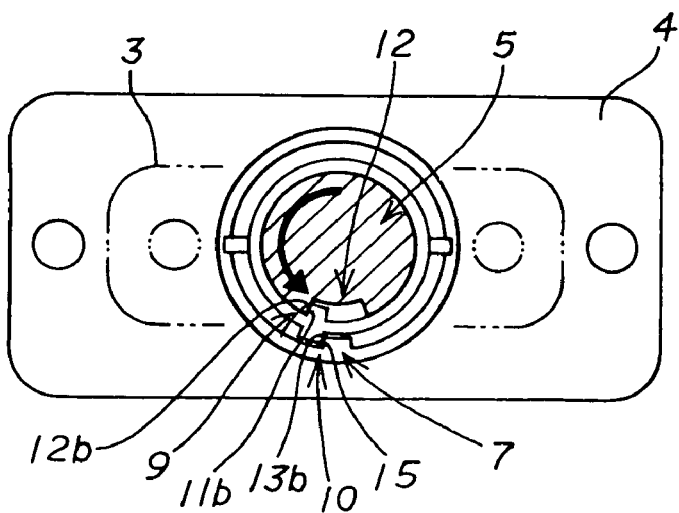

ELECTRONIC INSTRUMENT

TECHNICAL FIELD

The present invention relates to a an electronic instrument such as a note type personal computer, a mobile phone.

BACKGROUND ART

A conventionally proposed note type personal computer is generally of the type in which an operation portion (key board) equipped with letter keys or function keys is provided on an upper surface of a body portion which is to be located on a lower side; a display portion such as a liquid crystal panel on which a predetermined display is exhibited by a key operation of this operation portion or the like is provided on a collapsible surface side (coupling side) of a coupling portion which is to be located on an upper side; this body portion and the coupling portion are coupled with each other through a hinge device; and the coupling portion is reversed by the hinge device from a collapsed closed condition where the body portion and the coupling portion are half collapsed and coupled with each other to cover the operation portion with the coupling portion, whereby it is possible to switch over to an open condition where the operation portion and the display portion are exposed.

By the way, under the circumstances that a more practical function is desired to this note type personal computer, a two-axis type is proposed in which another hinge device is provided at a joint portion between the body portion and the coupling portion whereby not only may the coupling portion be rotated and raised to the body portion but also the coupling portion may be rotated in a horizontal direction in the condition that the coupling portion is raised to the body portion.

Namely, it is constructed so that not only may the coupling portion be opened and closed by the raising rotation but also the coupling portion may be rotated in the horizontal direction in this standing condition. For example, not only may a use condition where the display portion is directed in the opposite direction be obtained but also the display portion may be arranged on the upper side even when the coupling portion is collapsed to disable the operation of the keys, in other words, even if the coupling portion equipped with the display portion is coupled with the body portion to conceal the operation portion whereby it is possible to observe the display portion or to function the operation portion by a touch pen.

The present applicant has developed an electronic instrument that has an extremely high commercial value by the results of accumulated try and error to enhance the practical use aspect of the electronic equipment that is of the type that may be rotated in the horizontal direction.

DISCLOSURE OF THE INVENTION

An essence of the present invention will be described with reference to the accompanying drawings.

The invention is directed to an electronic instrument composed by pivoting a first member 1 provided with a display portion 1a to a second member 2, provided with an operating portion 2a and connected electrically to the first member 1 through wirings or the like, through a hinge device to be rotatable substantially in the horizontal direction, said hinge device characterized in that a first coupling member 3 having a shaft portion 5 is provided in one of said first member 1 and said second member 2, a second coupling member 4 having a bearing hole portion 6 for bearing said shaft portion 5 is provided in the other member, said first coupling member 3 and said second coupling member 4 are coupled with each other through the shaft portion 5 to be rotatable relative to each other so that the first member 1 may be rotated through the shaft portion 5 relative to the second member 2 in any direction of right and left directions, and an excessive rotation preventing mechanism 7 for preventing relative excessive rotation of the first member 1 in any direction of the right and left directions relative to the second member 2 is provided, the excessive rotation preventing mechanism 7 fits around an annular rotary member 8 provided to be rotatable in any direction of the right and left directions relative to said shaft portion 5, a first abutment retainer mechanism 9 is provided in which an abutment portion 12 with which a projection 8a provided on said rotary member 8 is brought into abutment is formed to project from a circumferential surface of the shaft portion 5 and in which the abutment portion 12 is abutted against and retained at the projection 8a even if the first coupling member 3 or the second coupling member 4 is rotated in any direction of the right and left directions so that said rotary member 8 is cooperatively rotated in the right and left directions together with the shaft portion 5, a second abutment retainer mechanism 10, in which a projecting portion is formed to project from a surface of the second coupling member 4 in which said projection 8a is abutted and retained and said abutment portion 12 is not abutted but allows the upward passage when said shaft portion 5 and said rotary member 8 are rotated together in any direction of the right and left directions, and said projection 8a abuts against and retained at the projecting portion to thereby prevent the cooperative rotation, is provided in said rotary member 8 and said second coupling member 4, and said excessive rotation preventing mechanism 7 is adapted to prevent the horizontal rotation of the first member 1 in a position where the first member 1 is directed to a real back side from a position where the first member 1 is directed to a real frontal side even if the first member 1 is rotated in any direction of the right and left directions in the horizontal direction to said second member 2.

Also, the invention relates to the electronic instrument according to claim 1, wherein the excessive rotation preventing mechanism 7 fits an annular rotary member 8 that is rotatable relative to said shaft portion 5 in any direction of the right and left directions, a first abutment portion 12 for being abutted against and retained at the respective right and left side portions of a projection 8a provided in said rotary member 8 when said first coupling member 3 or said second coupling member 4 is rotated in the respective right and left directions is provided to project from a circumferential surface of said shaft portion 5 and said first abutment portion 12 is abutted against and retained at the right and left side portions of the projection 8a, so that said shaft portion 5 and said rotary member 8 may be rotated in any direction of the right and left directions together to form said first abutment retainer mechanism 9, a second abutment retainer mechanism 10 is provided for preventing the cooperative rotation between the rotary member 8 and the shaft portion 5 by said first abutment retainer mechanism 9, said second abutment retainer mechanism 10 has a second abutment portion 14 formed to project from a surface of said second coupling member 4 for allowing an upward passage without abutting against the first abutment portion 12 while being retained at one side portion of right and left side portion of the projection 8a provided on said rotary member 8 when said shaft portion 5 and said rotary member 8 are rotated together in any one direction of said right and left directions, and a third abutment portion 15 is formed to project from a surface of said second coupling member 4 for allowing upward passage without the first abutment portion 12 abutting against and for being abutted against and retained at a side portion of the opposite side to the side portion for being abutted against the second abutment portion 14 out of the right and left side portions of the projection 8a provided on said rotary member 8 when the shaft portion 5 and said rotary member 8 are rotated in any direction together in the right and left direction.

Also, the invention relates to the electronic instrument according to claim 2, wherein a position where the first abutment portion 12 provided in shaft portion 5 is rotation-stopped by said first abutment retainer mechanism 9 and said second abutment retainer mechanism 10 when said first coupling member 3 or said second coupling member 4 is rotated in the left direction and a position where the first abutment portion 12 provided in shaft portion 5 is rotation-stopped by said first abutment retainer mechanism 9 and said second abutment retainer mechanism 10 when said first coupling member 3 or said second coupling member 4 is rotated in the right direction are identified with each other.

Also, the invention relates to an electronic instrument composed by pivoting a first member 1 provided with a display portion 1a to a second member 2, provided with an operating portion 2a and connected electrically to the first member 1 through wirings or the like, through a hinge device to be rotatable substantially in the horizontal direction, said hinge device characterized in that a first coupling member 3 having a shaft portion 5 in one of said first member 1 and said second member 2 is provided, a second coupling member 4 having a bearing hole portion 6 for bearing said shaft portion 5 in the other member, said first coupling member 3 and said second coupling member 4 are coupled with each other through the shaft portion 5 to be rotatable relative to each other so that the first member 1 may be rotated through the shaft portion 5 relative to the second member 2 in any direction of right and left directions, and an excessive rotation preventing mechanism 7 for preventing relative excessive rotation of the first member 1 in any direction of the right and left directions relative to the second member 2 is provided, the excessive rotation preventing mechanism 7 fits an annular rotary member 8 that is rotatable relative to said shaft portion 5 in any direction of the right and left directions, a first abutment portion 12 for being abutted against and retained at the respective right and left side portions of a projection 8a provided in said rotary member 8 when said first coupling member 3 or said second coupling member 4 is rotated in the respective right and left directions is provided to project from a circumferential surface of said shaft portion 5 and said first abutment portion 12 is abutted against and retained at the right and left side portions of the projection 8a, so that said shaft portion 5 and said rotary member 8 may be rotated in any direction of the right and left directions together to form said first abutment retainer mechanism 9, a second abutment retainer mechanism 10 is provided for preventing the cooperative rotation between the rotary member 8 and the shaft portion 5 by said first abutment retainer mechanism 9, said second abutment retainer mechanism 10 has a second abutment portion 14 formed to project from a surface of said second coupling member 4 for allowing an upward passage without abutting against the first abutment portion 12 while being retained at one side portion of right and left side portion of the projection 8a provided on said rotary member 8 when said shaft portion 5 and said rotary member 8 are rotated together in any one direction of said right and left directions, and a third abutment portion 15 is formed to project from a surface of said second coupling member 4 for allowing upward passage without the first abutment portion 12 abutting against and for being abutted against and retained, at a side portion of the opposite side to the side portion for being abutted against the second abutment portion 14 out of the right and left side portions of the projection 8a provided on said rotary member 8 when the shaft portion 5 and said rotary member 8 are rotated in any direction together in the right and left direction, wherein a position where the first abutment portion 12 provided in said shaft portion 5 is rotation-stopped by said first abutment retainer mechanism 9 and said second abutment retainer mechanism 10 when said first coupling member 3 or said second coupling member 4 is rotated in the left direction and a position where the first abutment portion 12 provided in said shaft portion 5 is rotation-stopped by said first abutment retainer mechanism 9 and said second abutment retainer mechanism 10 when said first coupling member 3 or said second coupling member 4 is rotated in the right direction are identified with each other, and said excessive rotation preventing mechanism 7 is adapted to prevent the horizontal rotation of the first member 1 in a position where the first member 1 is directed to a real back side from a position where the first member 1 is directed to a real frontal side even if the first member 1 is rotated in any direction of the right and left directions to said second member 2.

With the structure of the present invention as described above, it is possible to rotate the first member relative to the second member in any direction of the right and left direction, and not only is it possible to simply attain the relative rotation but also by providing the function to prevent the excessive rotation, it is possible to considerably enhance the performance of the electronic equipment that is of the horizontal rotation, for example, thereby providing a novel electronic instrument that is extremely high in practical use and an electronic instrument.

Also, the hinge device is constructed as described in the invention defined in claims 2 or 3 so that not only may the excessive rotation be prevented but also, for example, it is possible to provide a novel electronic instrument that may realize without failure the excessive rotation preventing function to enhance the practical use of the electronic equipment that may perform the horizontal rotation.

Also, the hinge device is constructed according to the invention defined by claim 4 so that a novel electronic instrument may be produced with the above-described resultant effects.

BRIEF DESCRIPTION OF THE DRAWINGS

FIG. 7 is a schematic operation illustrative, perspective view of the primary part of the first embodiment.

FIG. 8 is a schematic operation illustrative, plan sectional view of the primary part of the first embodiment.

FIG. 14 is a schematic operation illustrative, plan sectional view of the primary part of the second embodiment.

BEST MODE TO EMBODY THE INVENTION

Figure 1:
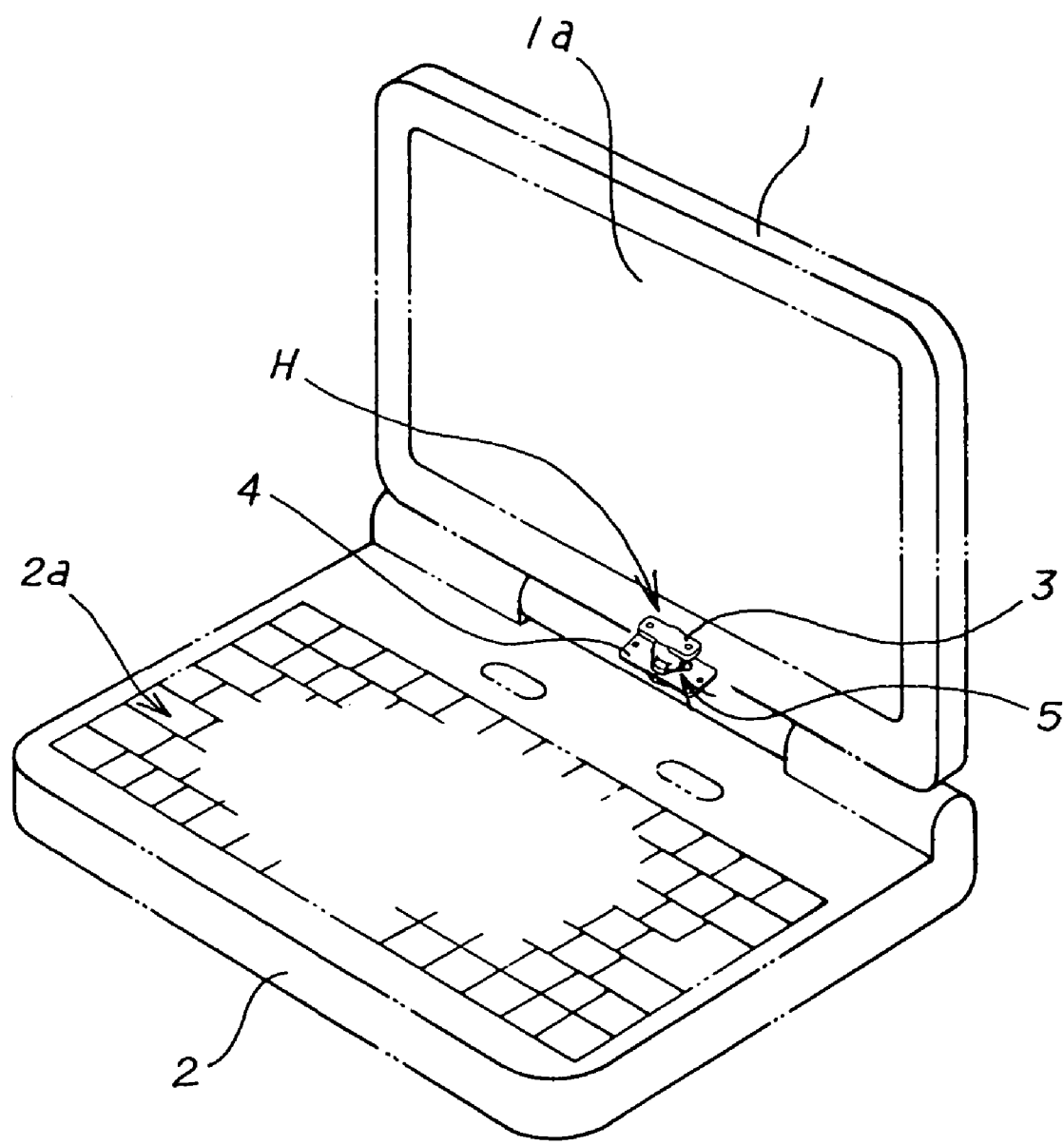
FIG. 1 is a use condition illustrative view of a first embodiment.

A preferable mode to embody the invention (how to embody the invention) will briefly be described with reference to the drawings while showing its resultant effects.

For example, a first coupling member 3 is provided to a first member 1; a second coupling member 4 is provided to a second member 2; and the first coupling member 3 and the second member 4 are coupled with each other rotatably relative to each other through a shaft portion 5 whereby the first member 1 and the second member 2 may be rotated relative to each other in a right and left direction.

Accordingly, for example, if the second member 2 is used as a body portion equipped with an operation portion and the first member 1 is used as a coupling portion equipped with a display portion, the first member 1 may be rotated relative to the second member 2 in any one of either right or left direction. Accordingly, for example, the user may rotate the member in any direction as desired every time to thereby make it possible to considerably enhance the handling property.

Also, an excessive rotation preventing mechanism 7 is provided for preventing the first member 1 from rotating relative to the second member 2 in any direction of the right and left directions. The first member 1 is prevented from rotating excessively relative to the second member 2 whereby, for example, in the case where the first member 1 and the second member 2 are electrically connected to each other through wiring or the like, it is possible to prevent without fail any disadvantage such as twisting and cutting of the wiring or the like.

By the way, this excessive rotation preventing mechanism 7 is provided with a rotary member 8 rotatably relative to any direction of the right and left directions relative to the above-described shaft portion 5. A first abutment retainer mechanism 9 for abutting and retaining to rotate the rotary member 8 together in the right and left directions even if the first coupling member 3 or the second coupling member 4 is rotated in any direction of the right and left directions is provided to the rotary member 8 and the first coupling member 3 or the second coupling member 4. At the same time, a second abutment and retainer mechanism 10 for preventing the rotation by the abutment and retention even if the first coupling member 3 or the second coupling member 4 and the rotary member 8 are rotated in any direction of the right and left directions is provided to the rotary member 8 and the second coupling member 4 or the first coupling member 3.

For example, in case of the application to the above-described two-axis type note type personal computer (in case of being assembled to a pivot portion for rotating substantially in the horizontal direction the first member 1 kept under the condition of standing to the second member 2), this contributes to, in any time, the easy-to-use condition that not only may the first member 1 be simply rotated in any direction of the right and left directions in the horizontal direction but also the first member 1 is rotated in the left direction in the horizontal direction or in the right direction in the horizontal direction.

Namely, in the case where this excessive rotation preventing mechanism 7 is adapted so that the one retainer projection provided in the first coupling member 3 and the one retainer projection provided in the second coupling member 4 are simply in abutment and retention with each other for preventing the relative rotation between the first coupling member 3 and the second coupling member 4, when the first member 1 is rotated in the horizontal direction in the right and left directions from the condition that the first member 1 is directed to the real frontal side, there is a problem that the first member 1 is not directed to the real back side when the first member 1 is rotated in either one direction in the horizontal direction.

More specifically, for example, in the case where it is set up so that, when the first member 1 is rotated in the left direction in the horizontal direction from the condition that the first member 1 is directed to the real front side, the retainer projection provided in the first coupling member 3 and the retainer projection provided in the second coupling member 4 are brought into abutment and retention with each other in the position where the first member 1 is directed to the real back side to thereby prevent the relative excessive rotation, inversely when the first member 1 is rotated in the right direction in the horizontal direction from the condition that the first member 1 is directed to the real frontal side, this first member 1 is not rotated relatively until the first member is directed to the real back side but stopped just before that position. Namely, the first member 1 is prevented from rotating under the condition that the first member 1 is slanted before the first member 1 is directed to the real back side by the thickness of the retainer projection of the second coupling member 4 and the thickness of the retainer projection of the first coupling member 3 so that the good use condition could not be obtained. (In the case where the first member 1 raised relative to the second member 2 is to fall down again to the coupling condition to the second member 2, this is only possible in the condition that the first member 1 is directed to the real frontal side or the real back side.) Of course, it is possible to cope with this problem by thinning the thickness of the retainer projection of the first coupling member 3 and the thickness of the retainer projection of the second coupling member 4. However, this is not a practical solution because the thickness is required to some extent in consideration of the mechanical strength.

In this point, according to the present invention, the excessive rotation preventing mechanism 7 is constituted by interposing the rotary member 8 between the first coupling member 3 and the second coupling member 4, whereby, for example, even if the first member 1 is rotated in any direction of the right and left directions in the horizontal direction, it is possible to realize, at any time, the condition that the relative excessive rotation of the first member 1 is prevented in the position that the first member 1 is kept under the condition directed to the real back side from the condition that the first member 1 is directed to the real frontal side.

FIGS. 1 to 10 show a first embodiment of the present invention and FIGS. 11 to 14 show a second embodiment thereof. The invention will now be described.

The first embodiment will be described.

The first embodiment is directed to the case where the present invention is applied to a note type personal computer. It is adapted so that an operation portion 2a which functions as a key board where letter keys or function keys or the like are arranged is provided on an upper surface side of a planar second member 2 (body portion 2) incorporating in a casing electronic parts such as a circuit board, a power source or the like; and a planar first member 1 (coupling portion 1) having substantially the same shape as that of the operation portion 2a and coupling and covering the operation portion 2a is pivotally coupled with this body portion 2 rotatably substantially in a horizontal direction by a hinge device H. (Incidentally, although the present embodiment will be described by utilizing the case where the note type personal computer is exemplified as an embodiment of an electronic instrument using the invention, it is possible to suitably apply the invention to any other type of an electronic instrument if it exhibits the characteristics of this embodiment.)

A display portion 1a such as a liquid crystal panel or the like exhibiting a predetermined display by a predetermined image field or the operation of the above-described operation portion 2a or receiving signals or the like is provided on the upper surface side of this coupling portion 1.

In this coupling between the body portion 2 and the coupling portion 1, coupling portions of end portions of the two portions are coupled with each other by the hinge device H having the shaft portion 5 arranged in a vertical direction; and this shaft portion 5 is coupled rotatably substantially in the horizontal direction as desired while being used as a rotary pivot shaft and coupled to be rotatable to the standing condition by the hinge device (not shown). Namely, this is of the two-axis type in which may not only the coupling portion 1 be rotated to be raises relative to the body portion 2 but also the coupling portion 1 may be rotated in the horizontal direction in the condition that the coupling portion is raised relative to the body portion 2.

The hinge device H according to this embodiment will now be described.

In this embodiment, the first coupling member 3 made of a metal plate fastened to the coupling portion 1 by screws is provided; the second coupling member 4 made of a metal plate fastened to the body portion 2 by screws is provided; and this first coupling member 3 and the second coupling member 4 are pivotally coupled with each other through the shaft portion 5 so that the first and second members may be rotated in any direction of the right and left directions relative to each other from the condition that the second member 2 is coupled with the first member 1.

More specifically, this shaft portion 5 is formed to project from an inner central portion of the first coupling member 3. A circular bearing hole portion 6 for bearing this shaft portion 5 under a pass-through condition is formed in an inner central portion. The coupling portion 1 is adapted to be coupled rotatably in any direction of the right and left directions to the body portion 2 substantially in the horizontal direction as a rotary pivot.

Also, in this embodiment, an excessive rotation preventing mechanism 7 is provided for preventing the coupling portion 1 from rotating relative to the body portion 2. Even if the coupling portion 1 is rotated in any direction of the right and left direction from the coupled condition relative to the body portion 2, this excessive rotation preventing mechanism 7 is adapted so that the relative excessive rotation is prevented in the same phase position from the condition where the coupling portion 1 is directed to the real frontal side to the condition where it is directed to the real back side (see FIG. 9).

More specifically, this excessive rotation preventing mechanism 7 is constructed so that an annular rotary member 8 that is rotatable in any direction of the right and left directions thereto is fitted and coupled with the shaft portion 5 provided in the first coupling member 3, a first abutment retainer mechanism 9 is provided for coming into abutment with and retained at this rotary member 8 and the first coupling member 3 even if the first coupling member 3 is rotated in any direction of the right and left directions so that the rotary member 8 is rotated together, and even if this first coupling member 3 and the rotary member 8 are rotated in any direction of the right and left directions together, a second abutment retainer mechanism 10 for preventing this cooperative rotation is provided to the rotary member 8 and the second coupling member 4.

More specifically explaining, in the above-described first abutment retainer mechanism 9, a first abutment portion 12 for abutting against and retaining the respective right and left portions 11b and 11a of a first retainer portion 11 located above a hook-shaped projection 8a formed to project from an outer circumferential surface of the rotary member 8 when the first coupling member 3 is rotated in the respective directions of the right and left directions is formed to project from the shaft portion 5 of the first coupling member 3. The first coupling member 3 is rotated in the right direction (axial rotation in the clockwise direction) so that one side portion 12a of the first abutment portion 12 is retained at one side portion 11a of the first retainer portion 11. As a result, the first coupling member 3 and the rotary member 8 are rotated together in the right direction. Inversely, the first coupling member 3 is rotated in the left direction (axial rotation in the counterclockwise direction), after the first abutment portion 12 is rotated through substantially one rotation, the other side portion 12b of the first abutment portion 12 is in abutment with and retained at the other side portion 11b of the first retainer portion 11 so that the first coupling member 3 and the rotary member 8 are rotated together in the left direction.

Figure 2:
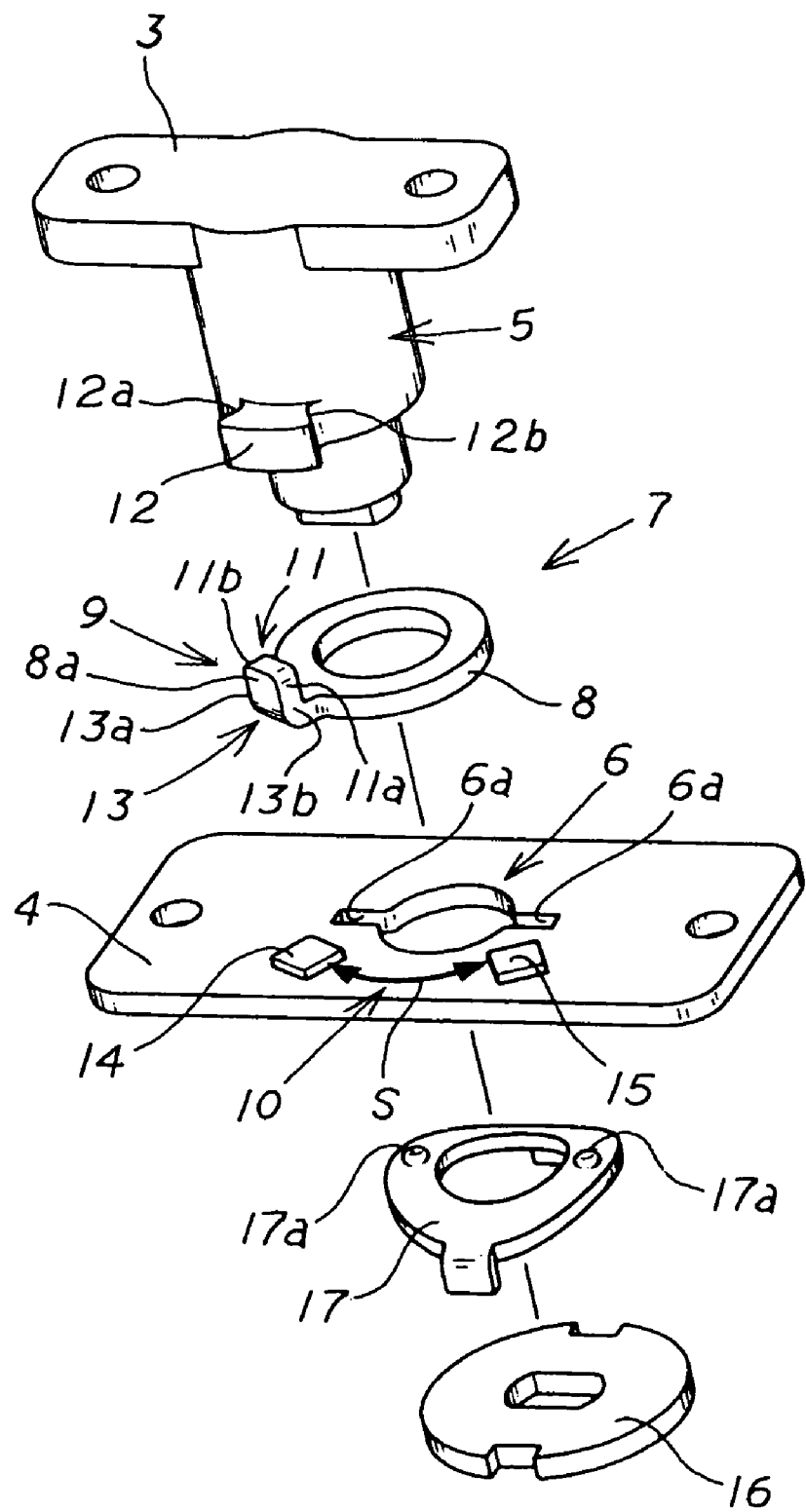
FIG. 2 is a perspective developed view of a primary part of the first embodiment.
Figure 3:
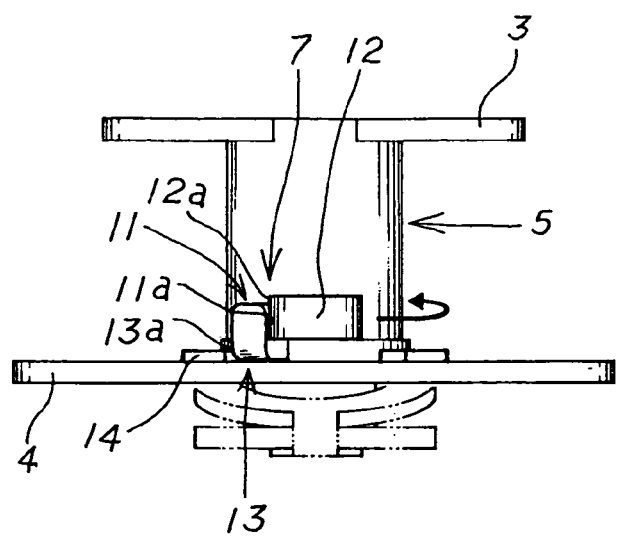
FIG. 3 is a schematic operation illustrative view of the primary part of the first embodiment.
Figure 4:
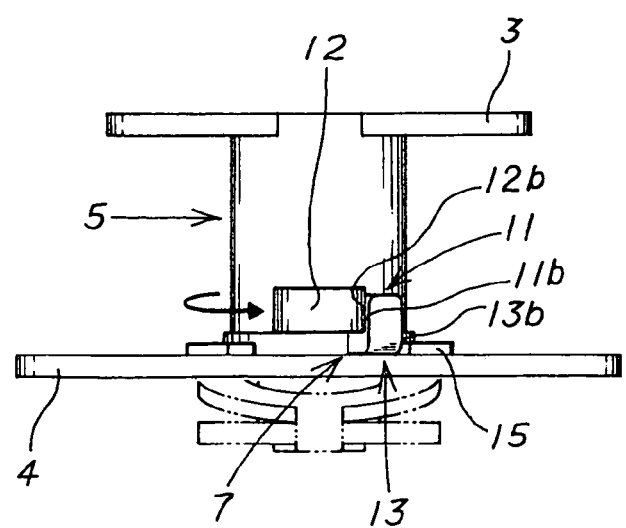
FIG. 4 is another schematic operation illustrative view of the primary part of the first embodiment.
Figure 5:
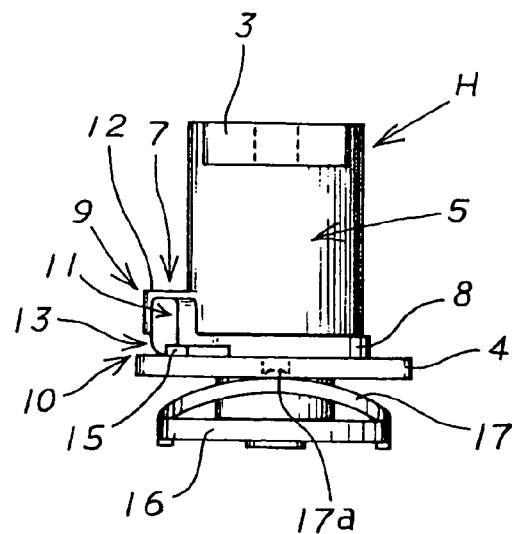
FIG. 5 is a side elevational view of the primary part of the first embodiment.
Figure 6:
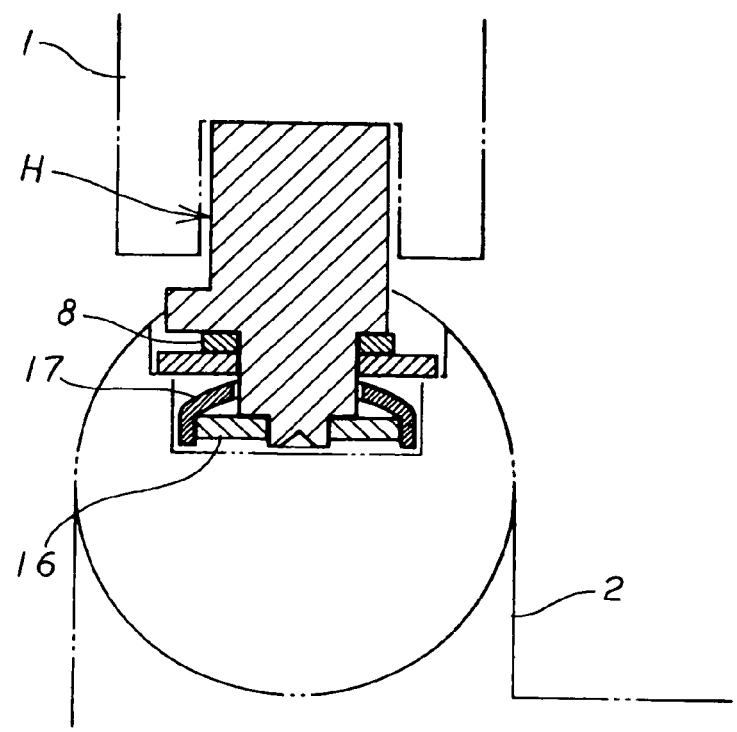
FIG. 6 is a side elevational, sectional view of the primary part of the first embodiment.

The second abutment retainer mechanism 10 is constructed as follows (see FIGS. 2, 3 and 4). A second abutment portion 14 for being retained in abutment with one side portion 13a of a second retainer portion 13 below the hook-shaped projection 8a formed on the outer circumferential surface of the above-described rotary member 8 to thereby prevent the cooperative rotation when the first coupling member 3 and the rotary member 8 are rotated together in the right direction by this first abutment retainer mechanism 9 is formed to project from the circumference of the bearing hole portion 6 on the upper surface of the second coupling member 4. A third abutment portion 15 for being retained in abutment with the other side portion 13b of the second retainer portion 13 provided in the rotary member 8 to thereby prevent its cooperative rotation when the first coupling member 3 and the rotary member 8 are rotated together inversely in the left direction is formed to project from the position on the upper surface of the second coupling member 4 at a predetermined interval S from the second abutment portion 14.

Also, the first abutment retainer mechanism 9 and the second abutment retainer mechanism 10 constituting this excessive rotation preventing mechanism 7 is adapted so that the position where the first abutment portion 12 provided in the first coupling member 3 is not rotated but stopped when the first coupling member 3 is rotated relative to the second coupling member 4 in the left direction and the position where the first abutment portion 12 provided in the first coupling portion 3 is not rotated but stopped when the first coupling member 3 is rotated relative to the second coupling member 4 in the right direction are identified in the same position.

Namely, in this embodiment, when this shaft portion 5 is rotated in either one direction of the right and left directions within the range of 360 degrees, the first abutment portion 12 is prevented from excessively rotating in the same phase position. This is attained by setting a thickness (width) L1 of the first abutment portion 12, a thickness (width) L2 of the hook-shaped projection 8a (first retainer portion 11 and second retainer portion 13) and an interval S between the third abutment portion 15 and the second abutment portion 14 related to the second abutment retainer mechanism 10 (see FIGS. 7 and 8). In this embodiment, the first coupling member 3 may be rotated through 300 degrees in any direction of the right and left directions relative to the rotary member 8 until the first abutment portion 12 of the first coupling member 3 is retained against the first retainer portion 11 of the rotary member 8, and the rotary member 8 may be rotated through 60 degrees in any direction of the right and left directions relative to the second coupling member 4 until the second retainer member 13 of the rotary member 8 is abutted against and retained at the third abutment portion 15 and the second abutment portion 14 of the second coupling member 4. In summary, it is essential that the sum (R1+R2) of a relative rotational range R1 between the rotary member 8 and the first coupling member 3 restricted by the first abutment retainer mechanism 9 and a relative range R2 between the rotary member 8 and the second coupling member 4 restricted by the second abutment retainer mechanism 10 be 360 degrees.

Incidentally, in this embodiment, the rotation allowable range of the excessive rotation preventing mechanism 7 is set to 360 degrees. However, in some cases, it is possible to set the allowable range to 360 degree or more by setting a relative rotational range restricted by the second abutment retainer mechanism 10 and the first abutment retainer mechanism 9.

Figure 9:
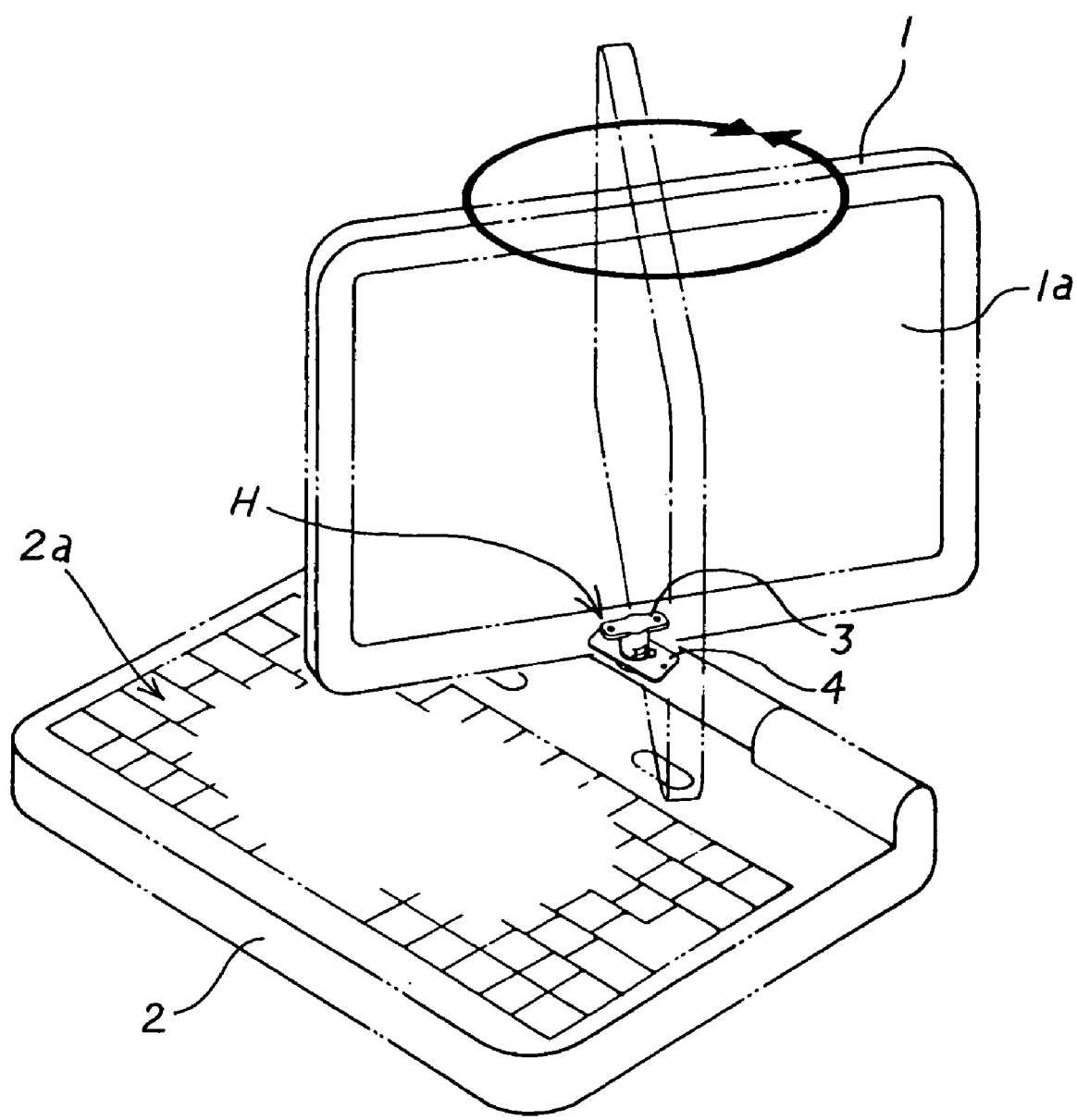
FIG. 9 is a use condition illustrative view of the first embodiment.
Figure 10:
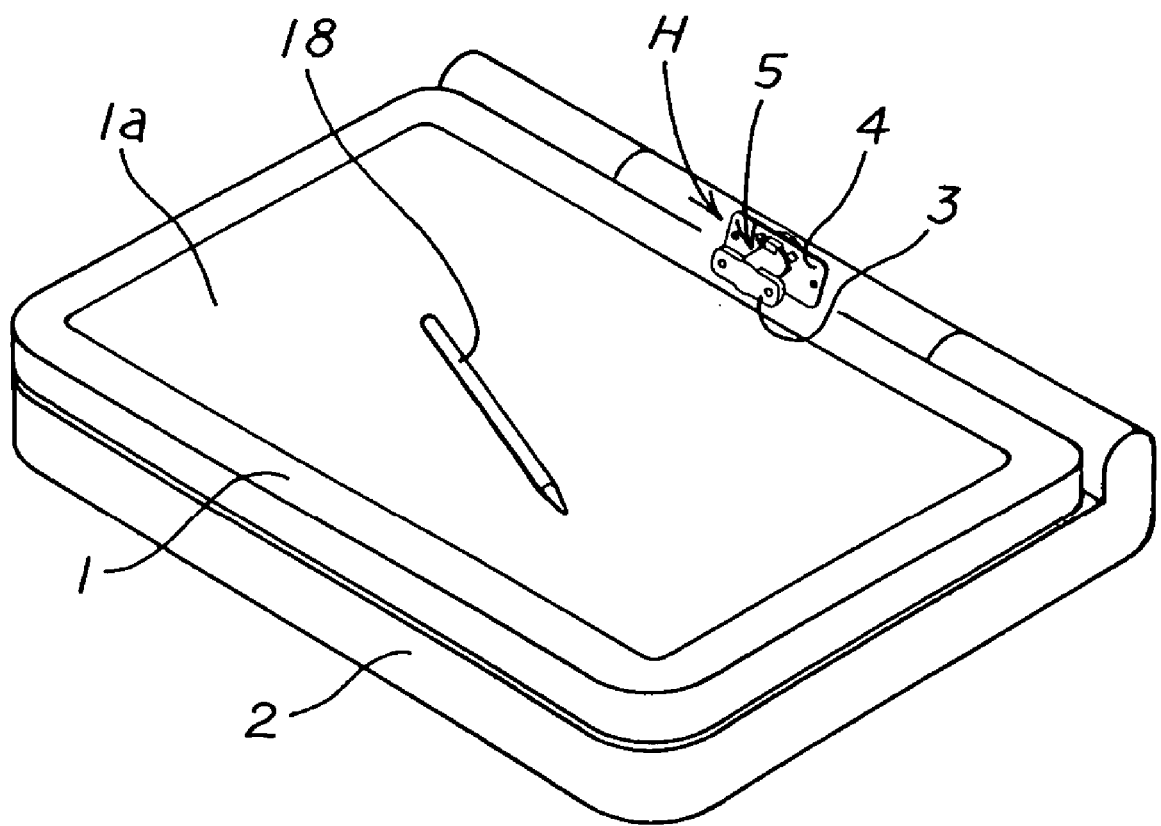
FIG. 10 is another use condition illustrative view of the first embodiment.
Figure 11:
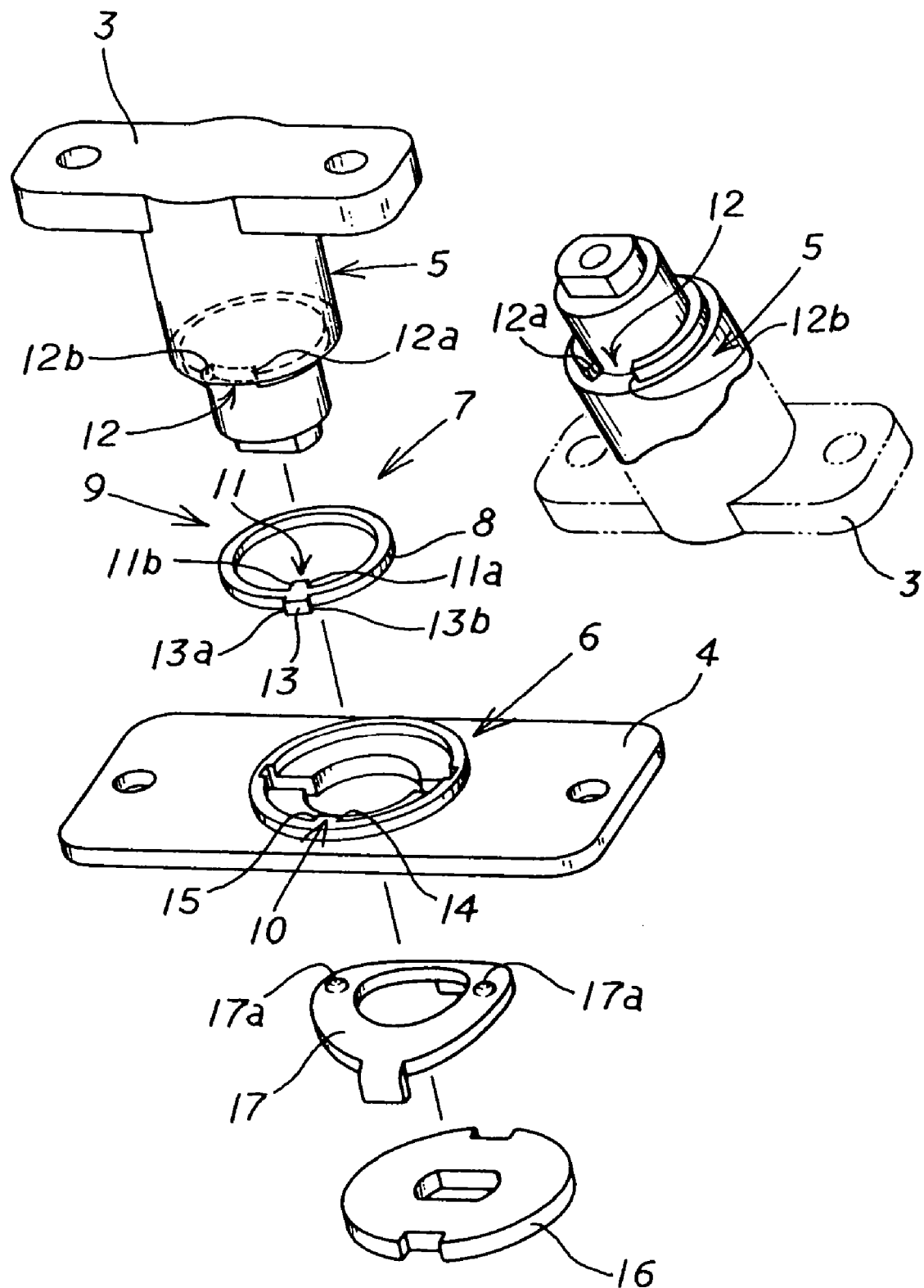
FIG. 11 is an exploded perspective view of a primary part of a second embodiment.
Figure 12:
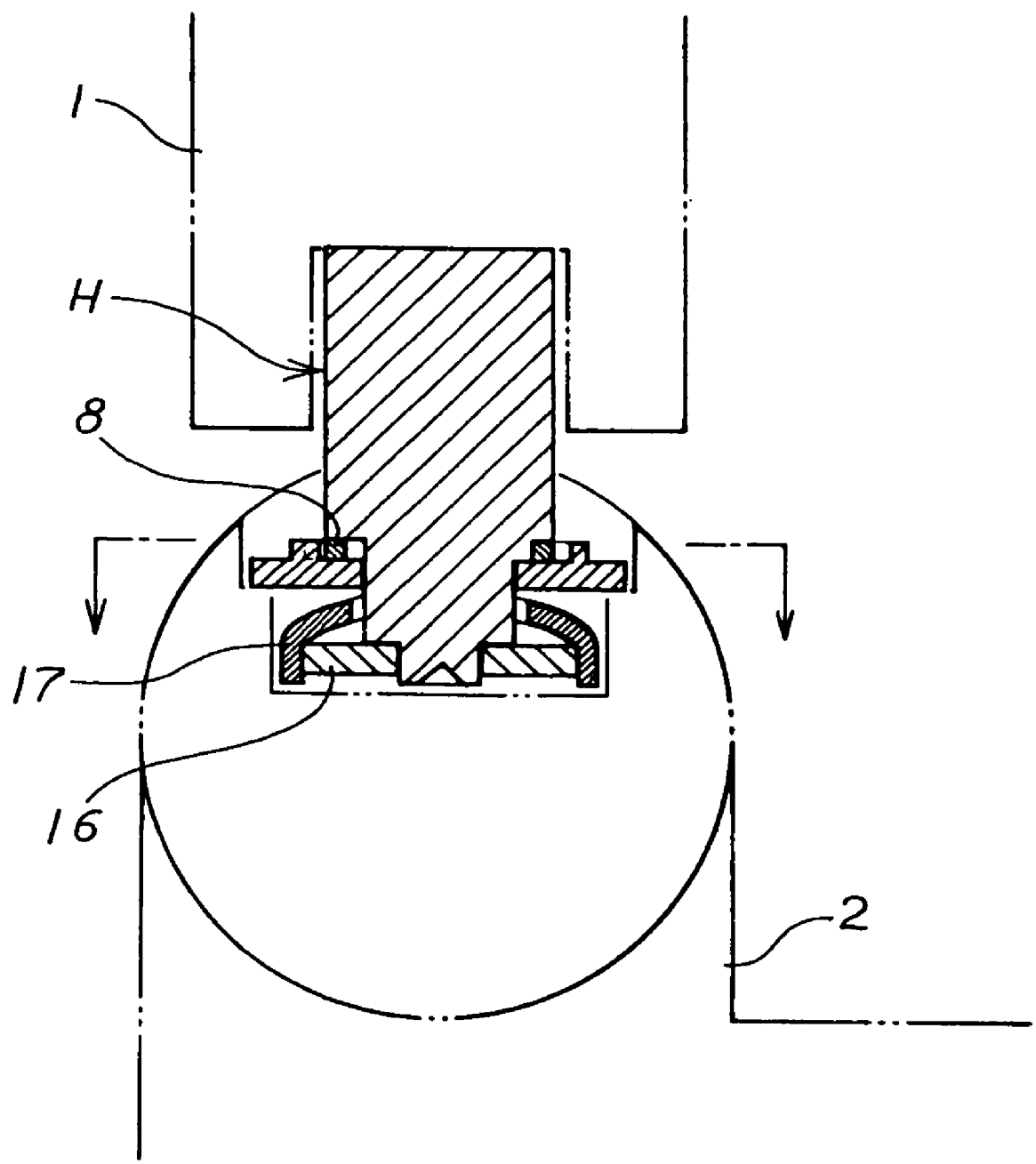
FIG. 12 is a side elevational, sectional view of the primary part of the second embodiment.
Figure 13:
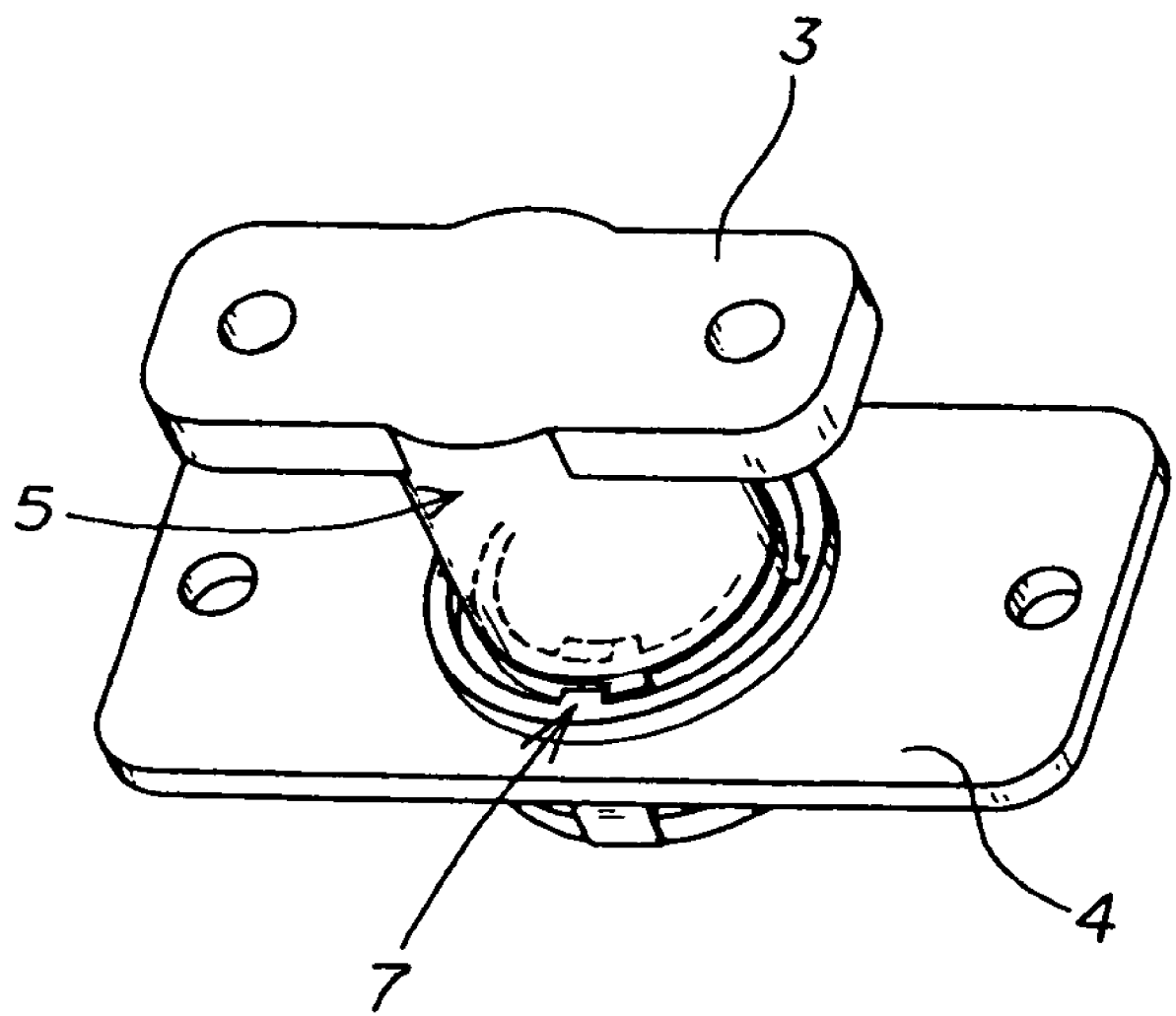
FIG. 13 is a perspective view of the primary part of the second embodiment.

When the body portion 2 and the coupling portion 1 are coupled rotatably with each other in the horizontal direction in the right and left direction through the hinge device H provided with the excessive rotation preventing mechanism 7 thus far constructed, the excessive rotation preventing mechanism 7 is assembled to function to prevent the rotation in the position kept under the condition directed to the real back side of the display portion 1a of the coupling portion 1 (see FIG. 9).

This assembly is advantageous in consideration of twisting of the wiring or the like provided between the body portion 2 and the coupling portion 1.

Namely, this is the case where the coupling portion 1 (display portion 1a) is directed to the real frontal side without any twist of the wirings. If the excessive rotation preventing function is exhibited by the excessive rotation preventing mechanism 7 in the position where the coupling portion 1 (display portion 1a) is directed to the real frontal side, since the coupling portion 1 is rotatable in the horizontal direction through 360 degrees, the wirings are subjected to the twist due to the horizontal rotation through 360 degrees. In this connection, in the case where the excessive rotation preventing function is exhibited by the excessive rotation preventing mechanism 7 in the position where the coupling portion 1 (display portion 1a) is directed to the real back side, there is no fear that the coupling portion 1 would be rotated at maximum through 180 degrees or more in the same direction in the horizontal direction from the condition where the coupling portion 1 (display portion 1a) is directed to the real frontal side, the twist of the wirings or the like may be prevented as much as possible.

Also, in this embodiment, the coupling between the shaft portion 5 of the first coupling member 3 and the bearing hole portion 6 of the second coupling member 4 is attained by the pull-apart preventing coupling to the shaft portion 5 passing through the bearing hole portion 6 through a seat 16, through an elastic member 17 composed of a leaf spring brought into contact with the second coupling member 4. A pressure contact portion 17a provided in this elastic member 17 is brought into elastic contact with the outer surface of the second coupling member 4.

Namely, a projection is formed as the pressure contact portion 17a on the ring-shaped leaf spring 17 and the leaf spring 17 is deformed so that the shaft portion 5 is fastened and coupled to the bearing portion 6 whereby this projecting pressure contact portion 17a is brought into elastic contact with the second coupling member 4 to generate the resistance in the horizontal rotation of the coupling portion 1 to the body portion 2. By setting the rotational resistance to a predetermined value, it is possible to perform the manual, smooth horizontal rotation but it is possible to realize a so-called free stop condition that the retention of the coupling portion 1 may be held in the position where the hand is released.

Also, in this embodiment, a position retainer mechanism for positioning and retaining the horizontal rotation of the shaft portion 5 in a predetermined position is provided so that the above-described coupling portion 1 (display portion 1a) is rotation-retained in the position where it is directed at least to the real frontal position.

More specifically, in this embodiment, the position retainer mechanism is formed by utilizing the above-described projecting pressure contact portion 17a. A pair of recess edge portions 6a with which the pressure contact portion 17a is to be engaged is provided in the hole edge confronting positions of the above-described bearing hole portion 6. (It is possible to form the engagement hole, discrete from the bearing hole portion 6, in the second coupling member 4.) The pressure contact portion 17a is adapted to fall in the recess edge portions 6a (or retainer holes) to be positioned and retained from the condition that the pressure contact portion 17a is in pressing contact with the second coupling member 4, so that the coupling portion 1 (display portion 1a) is kept in the condition that it is directed to the real frontal side without any fluctuation for ensuring the easy-use condition (so-called click cam mechanism).

Incidentally, an air hollow portion is formed in the axial direction of the shaft portion 5. It is possible to adopt an arrangement where electric wires or the like are inserted and arranged in the air hollow portion for the rotation of the coupling portion 1.

Also, in this embodiment, since the first coupling member 3, the shaft portion 5, the second coupling member 4 and the like are made of conductive metal material, it is possible to adopt a structure where this hinge device H itself is used as a conductive portion to electrically connect the body side 2 (second member 2) side and the coupling portion 1 (first member 1) side with each other.

Reference numeral 18 denotes a pen for touching the display portion 1a to perform input.

A second embodiment will now be described.

In the second embodiment, another type is provided as the excessive rotation preventing mechanism 7 related to the first embodiment.

Namely, in this excessive rotation preventing mechanism 7, in the same manner as in the first embodiment, an annular rotary member 8 that is rotatable in any direction of the right and left directions relative to the shaft portion 5 provided in the first coupling member 3 is fitted and coupled therewith. A first abutment retainer mechanism 9 in which this first coupling member 3 is in abutment and retained when the first coupling member 3 is rotated in any direction of the right and left direction so that the rotary member 8 is rotated together for cooperative rotation in the right and left direction is provided to the rotary member 8 and the first coupling member 3. A second abutment retainer mechanism 10 for preventing, by abutment retention, the cooperative rotation between the first coupling member 3 and the rotary member 8 by the first abutment retainer mechanism 9 is provided to the rotary member 8 and the second coupling member 4.

More specifically describing, a first abutment portion 12 made of a recess portion abutted and retained against the respective right and left side portions 11b and 11a of a first retainer portion 11 made of a convex portion projecting from an inner circumferential surface of the rotary member 8 when the first coupling member 3 is rotated in the respective right and left directions is formed in the shaft portion 5 of the first coupling member 3. The first coupling member 3 is rotated in the right direction (axial rotation in the clockwise direction) so that one side portion 12a of the first abutment portion 12 is retained at one side portion 11a of the first retainer portion 11. As a result, the first coupling member 3 and the rotary member 8 are rotated together in the right direction. Inversely, the first coupling member 3 is rotated in the left direction (axial rotation in the counterclockwise direction), after the first abutment portion 12 is rotated through a width of the recess portion, the other side portion 12b of the first abutment portion 12 is in abutment with and retained at the other side portion 11b of the first retainer portion 11 so that the first coupling member 3 and the rotary member 8 are rotated together in the left direction.

A second abutment retainer mechanism 10 is formed as follows (see FIGS. 11 to 14). A second abutment portion 14 for being abutted against and retained at one side portion 13a of a second retainer portion 13 made of a convex portion projecting from an outer circumferential surface of the rotary member 8 when the first coupling member 3 and the rotary member 8 are rotated together in the right direction by the first abutment retainer mechanism 9 to thereby prevent the cooperative rotation is provided on one side portion of a convex portion projecting inside of the circular concave bearing hole portion 6 formed on the top surface of the second coupling member 4. Inversely, a third abutment portion 15 for being abutted against and retained at the other side portion 13b of a second retainer portion 13 made of a convex portion projecting from an outer circumferential surface of the above-described rotary member 8 to thereby prevent the cooperative rotation when the first coupling member 3 and the rotary member 8 are rotated together in the left direction is provided on the other side portion of the convex portion projecting inside of the annular recess bearing hole portion 6 formed on the upper surface of the second coupling member 4.

The other structure is the same as that of the first embodiment.

The invention claimed is:

1. An electronic instrument composed by pivoting a first member provided with a display portion to a second member, provided with an operating portion and connected electrically to the first member, through a hinge device to be rotable substantially in the horizontal direction, said hinge device characterized in that a first coupling member having a shaft portion is provided in one of said first member and said second member, a second coupling member having a bearing hole portion for bearing said shaft portion is provided in the other member, said first coupling member and said second coupling member are coupled with each other through the shaft portion to be rotable relative to each other so that the first member is rotated through the shaft portion relative to the second member in any direction of right and left directions, and an excessive rotation preventing mechanism for presenting relative excessive rotation of the first member in any direction of the right and left directions relative to the second member is provided, an annular rotary member is provided to be rotatable in any direction of the right and left directions relative to said shaft portion, a first abutment retainer mechanism is provided in which a first abutment portion with which a projection provided on said rotary member is brought into abutment is formed to project from a circumferential surface of the shaft portion in which the first abutment portion is abutted against and retained at the projection even if the first coupling member or the second coupling member is rotated in any direction of the right and left directions so that said rotary member is cooperatively rotated in the right and left directions together with the shaft portion, a second abutment retainer mechanism is provided, in which a projecting portion is formed to project from a surface of the second coupling member on which said projection is butted and retained and said first abutment portion allows the upward passage when said shaft portion and said rotary member are rotated together in any direction of the right and left directions, and said projection abuts against and retained at the projecting potion to thereby prevent the cooperative rotation in said rotary member and said second coupling member, and said excessive rotation preventing mechanism prevents the horizontal rotation of the first member in a position where the first member is directed to real back side from a position where the first member is directed to a real frontal side even of the first member is rotated in any direction of the right and left directions in the horizontal direction to said second member, wherein a first abutment portion for being abutted against and retained at the respective right and left side portions of a projection provided in said rotary member when said first coupling member or said second coupling member is rotated in the respective right and left directions is provided to project from a circumferential surface of said shaft portion and said first abutment portion is abutted against and retained at the right and left side portions of the projection, so that said shaft portion and said rotary member is rotated in any direction of the right and left directions together to form said first abutment retainer mechanism, a second abutment retainer mechanism is provided for preventing the cooperative rotation between the rotary member and the shaft portion, said second abutment retainer mechanism has a second abutment portion formed to project from a surface of said second coupling member for allowing an upward passage without abutting against the first abutment portion while being retained at one side portion of right and left side portion of the projection provided on said rotary member when said shaft portion and said rotary member are rotated together in any one direction of said right and left directions, and a third abutment portion is formed to project from a surface of said second coupling member for allowing upward passage without the first abutment portion abutting against and for being abutted against by and retained at a side portion of the opposite side to the side portion for being abutted against by the second abutment portion out of the right and left side portions of the projection provided on said rotary member when the shaft portion and said rotary member are rotated in any direction together in the right and left direction.

2. The electronic instrument according to claim 1, wherein a position where the first abutment portion provided in said shaft portion is rotation-stopped by said first abutment retainer mechanism and said second abutment retainer mechanism when said first coupling member or said second coupling member is rotated in the left direction and a position where the first abutment portion provided in said shaft portion is rotation-stopped by said first abutment retainer mechanism and said second abutment retainer mechanism when said first coupling member or said second coupling member is rotated in the right direction are identified with each other.

3. An electronic instrument composed by pivoting a first member provided with a display portion to a second member, provided with an operating portion and connected electrically to the first member, through a hinge device to be rotatable substantially in the horizontal direction, said hinge device characterized in that a first coupling member having a shaft portion is provided in one of said first member and said second member, a second coupling member having a bearing hole portion for bearing said shaft portion is provided in the other member, said first coupling member and said second coupling member are coupled with each other through the shaft portion to be rotatable relative to each other so that the first member is rotated through the shaft portion relative to the second member in any direction of right and left directions, and an excessive rotation preventing mechanism for preventing relative excessive rotation of the first member in any direction of the right and left directions relative to the second member is provided, an annular rotary member that is provided to be rotatable relative to said shaft portion in any direction of the right and left directions, a first abutment portion for being abutted against and retained at the respective right and left side portions of a projection provided in said rotary member when said first coupling member or said second coupling member is rotated in the respective right and left directions is provided to project from a circumferential surface of said shaft portion and said first abutment portion is abutted against and retained at the right and left side portions of the projection, so that said shaft portion and said rotary member are rotated in any direction of the right and left directions together to form a first abutment retainer mechanism, a second abutment retainer mechanism is provided for preventing the cooperative rotation between the rotary member and the shaft portion, said second abutment retainer mechanism has a second abutment portion formed to project from a surface of said second coupling member for allowing an upward passage without abutting against the first abutment portion while being retained at one side portion of right and left side portion of the projection provided on said rotary member when said shaft portion and said rotary member are rotated together in any one direction of said right and left directions, and a third abutment portion is formed to project from a surface of said second coupling member for allowing upward passage without the first abutment portion abutting against and for being abutted against by and retained at a side portion of the opposite side to the side portion for being abutted against by the second abutment portion out of the right and left side portions of the projection provided on said rotary member when the shaft portion and said rotary member are rotated in any direction together in the right and left direction, wherein a position where the first abutment portion provided in said shaft portion is rotation-stopped by said first abutment retainer mechanism and said second abutment retainer mechanism when said first coupling member or said second coupling member is rotated in the left direction and a position where the first abutment portion provided in said shaft portion is rotation-stopped by said first abutment retainer mechanism and said second abutment retainer mechanism when said first coupling member or said second coupling member is rotated in the right direction are identified with each other, and said excessive rotation preventing mechanism prevents the horizontal rotation of the first member in a position where the first member is directed to a real back side from a position where the first member is directed to a real frontal side even if the first member is rotated in any direction of the right and left directions to said second member.

4. An electronic instrument composed by pivoting a first member provided with a display portion to a second member, provided with an operating portion and connected electrically to the first member, through a hinge device to be rotatable substantially in the horizontal direction, said hinge device characterized in that a first coupling member having a shaft portion is provided in one of said first member and said second member, a second coupling member having a bearing hole portion for bearing said shaft portion is provided in the other member, said first coupling member and said second coupling member are coupled with each other through the shaft portion to be rotatable relative to each other so that the first member is rotated through the shaft portion relative to the second member in any direction of right and left directions, and an excessive rotation preventing mechanism for preventing relative excessive rotation of the first member in any direction of the right and left directions relative to the second member is provided, an annular rotary member is provided to be rotatable in any direction of the right and left directions relative to said shaft portion, a first abutment retainer mechanism is provided in which a first abutment portion with which a projection provided on said rotary member is brought into abutment is formed to project from a circumferential surface of the shaft portion and in which the first abutment portion is abutted against and retained at the projection even if the first coupling member or the second coupling member is rotated in any direction of the right and left directions so that said rotary member is cooperatively rotated in the right and left directions together with the shaft portion, a second abutment retainer mechanism is provided, in which a projecting portion is formed to project from a surface of the second coupling member in which said projection is abutted and retained and said first abutment portion allows upward passage when said shaft portion and said rotary member are rotated together in any direction of the right and left directions, and said projection abuts against and retained at the projecting, portion to thereby prevent the cooperative rotation in said rotary member and said second coupling member, and said excessive rotation preventing mechanism prevents the horizontal rotation of the first member in a position where the first member is directed to a real back side from a position where the first member is directed to a real frontal side even if the first member is rotated in any direction of the right and left directions in the horizontal direction to said second member.

* * * * *

UNITED STATES PATENT AND TRADEMARK OFFICE
CERTIFICATE OF CORRECTION

| | |
|---|---|
| PATENT NO. | : 7,155,781 B2 |
| APPLICATION NO. | : 10/540205 |
| DATED | : January 2, 2007 |
| INVENTOR(S) | : Tsuneo Yamada et al. |

Page 1 of 1

It is certified that error appears in the above-identified patent and that said Letters Patent is hereby corrected as shown below:

In the Claims section of the Specification please change:

Column 12
Claim 1, line 33, replace "butted" with --abutted--; and

Claim 1, line 43, replace "even of the first" with --even if the first.--

Signed and Sealed this

Fifteenth Day of May, 2007

JON W. DUDAS
*Director of the United States Patent and Trademark Office*